US012162178B2

(12) United States Patent
Rogers et al.

(10) Patent No.: US 12,162,178 B2
(45) Date of Patent: Dec. 10, 2024

(54) BLADE ASSEMBLY FOR CUTTING FOOD

(71) Applicant: McCain Foods Limited, Florenceville-Bristol (CA)

(72) Inventors: David M. Rogers, Skiff Lake (CA); John Warren Aikens, New Maryland (CA); Sylvain Bömont, La Madeleine (FR)

(73) Assignee: McCain Foods Limited, Florenceville-Bristol (CA)

( * ) Notice: Subject to any disclaimer, the term of this patent is extended or adjusted under 35 U.S.C. 154(b) by 0 days.

(21) Appl. No.: 18/140,651

(22) Filed: Apr. 28, 2023

(65) Prior Publication Data

US 2023/0256642 A1 Aug. 17, 2023

Related U.S. Application Data

(62) Division of application No. 17/386,087, filed on Jul. 27, 2021, now Pat. No. 11,673,285, which is a (Continued)

(51) Int. Cl.
*B26D 7/26* (2006.01)
*B26D 1/00* (2006.01)
(Continued)

(52) U.S. Cl.
CPC ......... *B26D 7/2614* (2013.01); *B26D 1/0006* (2013.01); *B26D 1/03* (2013.01); (Continued)

(58) Field of Classification Search
CPC .... B26D 7/2614; B26D 3/26; B26D 2210/02; B26D 2001/004; B26D 1/006;
(Continued)

(56) References Cited

U.S. PATENT DOCUMENTS

| | | | |
|---|---|---|---|
| 298,115 | A | 5/1884 | Peace |
| 548,145 | A | 10/1895 | Summers |

(Continued)

FOREIGN PATENT DOCUMENTS

| | | | |
|---|---|---|---|
| CA | 2893232 | A1 | 2/2016 |
| CN | 202085689 | U | 12/2011 |

(Continued)

OTHER PUBLICATIONS

Document relating to European Application No. 20164001, dated Jul. 23, 2020 (Extended European Search Report), 7 pages.

(Continued)

*Primary Examiner* — Ghassem Alie
(74) *Attorney, Agent, or Firm* — SMART & BIGGAR LP

(57) ABSTRACT

A blade assembly includes a blade support frame, and a plurality of V-shaped blades removably fastened to the blade support frame. The blade support frame has a food flow path extending downstream, and a plurality of blade mounts distributed around the food flow path. Each V-shaped blade has a first end portion connected to one of the blade mounts, a second end portion connected to another of the blade mounts, and an intermediate portion extending from the first end portion to the second end portion into the food flow path. At the first and second end portions of each V-shaped blade, a respective one of the blade mounts overlies both the upstream edge and the downstream edge of the V-shaped blade to inhibit the V-shaped blade from rotating when impacted by food.

10 Claims, 15 Drawing Sheets

Related U.S. Application Data division of application No. 16/358,846, filed on Mar. 20, 2019, now Pat. No. 11,104,025.

(51) Int. Cl.

| | |
|---|---|
| ***B26D 1/03*** | (2006.01) |
| ***B26D 3/26*** | (2006.01) |
| *B26D 7/06* | (2006.01) |

(52) U.S. Cl.

CPC .......... *B26D 3/26* (2013.01); *B26D 2001/004* (2013.01); *B26D 2001/006* (2013.01); *B26D 7/0658* (2013.01); *B26D 2210/02* (2013.01)

(58) Field of Classification Search

CPC ............ B26D 7/0658; B26D 2001/006; B26D 2001/0033; B26D 3/185; B26D 1/553; D26D 3/185; A23L 19/18; Y10T 83/9495; Y10T 83/9498; Y10T 83/6481; Y10T 83/6472; Y10T 83/6584; Y10T 83/2066; Y10T 83/6475; Y10T 83/6588; Y10S 83/932

USPC .... 83/13, 425, 858, 857, 402, 425.003, 932, 83/27, 856, 425.1, 404.3, 407, 98, 404.4, 83/425.2; 426/518, 144; 99/837, 538, 99/545

See application file for complete search history.

(56) References Cited

U.S. PATENT DOCUMENTS

| | | | | |
|---|---|---|---|---|
| 2,394,034 | A | 2/1946 | Blum | |
| 4,294,013 | A | 10/1981 | Krieg | |
| 5,009,141 | A | 4/1991 | Julian et al. | |
| 5,046,388 | A | 9/1991 | Mendenhall | |
| 5,125,308 | A | 6/1992 | Mendenhall | |
| 5,337,640 | A | 8/1994 | Arnoth et al. | |
| 5,473,967 | A | 12/1995 | Frey et al. | |
| 6,244,153 | B1 | 6/2001 | Mcinnes et al. | |
| 6,386,469 | B1 | 5/2002 | Meister et al. | |
| 6,725,765 | B1 | 4/2004 | Mendenhall | |
| 6,959,636 | B2 | 11/2005 | Graziano | |
| 7,096,771 | B2 | 8/2006 | Mendenhall | |
| 7,530,303 | B2 * | 5/2009 | Krueger | A01J 27/00 99/452 |
| 9,914,232 | B2 * | 3/2018 | Walker | B26D 3/26 |
| 2004/0040427 | A1 | 3/2004 | Mendenhall | |
| 2004/0043115 | A1 | 3/2004 | Mendenhall | |
| 2004/0168328 | A1 | 9/2004 | Thomas et al. | |
| 2004/0194597 | A1 | 10/2004 | Graziano | |
| 2005/0000344 | A1 | 1/2005 | Bucks | |
| 2005/0194000 | A1 | 9/2005 | Todack | |
| 2006/0283339 | A1 | 12/2006 | Jensen et al. | |
| 2007/0264418 | A1 | 11/2007 | Young et al. | |
| 2010/0236372 | A1 | 9/2010 | Desailly et al. | |
| 2014/0224086 | A1 | 8/2014 | Bomont et al. | |
| 2015/0273719 | A1 | 10/2015 | Aikens et al. | |
| 2020/0298435 | A1 | 9/2020 | Rogers et al. | |

FOREIGN PATENT DOCUMENTS

| | | | |
|---|---|---|---|
| CN | 204510329 | U | 7/2015 |
| CN | 108032351 | A | 5/2018 |
| CN | 207696569 | U | 8/2018 |
| CN | 108656189 | A | 10/2018 |
| DE | 102005001471 | A1 | 7/2006 |
| EP | 995558 | A2 | 4/2000 |
| EP | 2408599 | A1 | 1/2012 |
| JP | 2006523148 | A | 10/2006 |
| SU | 1697709 | A1 | 12/1991 |
| WO | 2010105355 | A1 | 9/2010 |

OTHER PUBLICATIONS

FSI FIIP, "Office Action and Search Report", dated Dec. 23, 2022, RU App. No. 2020111220, 8 pages.
CNIPA, "First Office Action and Search Report," dated Sep. 15, 2023, CN App. No. 2020101980430, 25 pages.
CNIPA, "Second Office Action and Supplemental Search Report," dated Nov. 13, 2023, CN App. No. 2020101980430, 21 pages.
JPO, "Office Action," dated Oct. 16, 2023, JP App. No. 2022-045298, 15 pages.

* cited by examiner

BLADE ASSEMBLY FOR CUTTING FOOD

FIELD

This application relates to the field of blade assemblies for cutting food, such as vegetables and fruit.

INTRODUCTION

This application relates to blade assemblies for cutting food into pieces. More particularly, this application relates to blade assemblies comprising a plurality of V-shaped blades that cut food into wedge shaped food pieces.

DRAWINGS

SUMMARY

Figure 1:
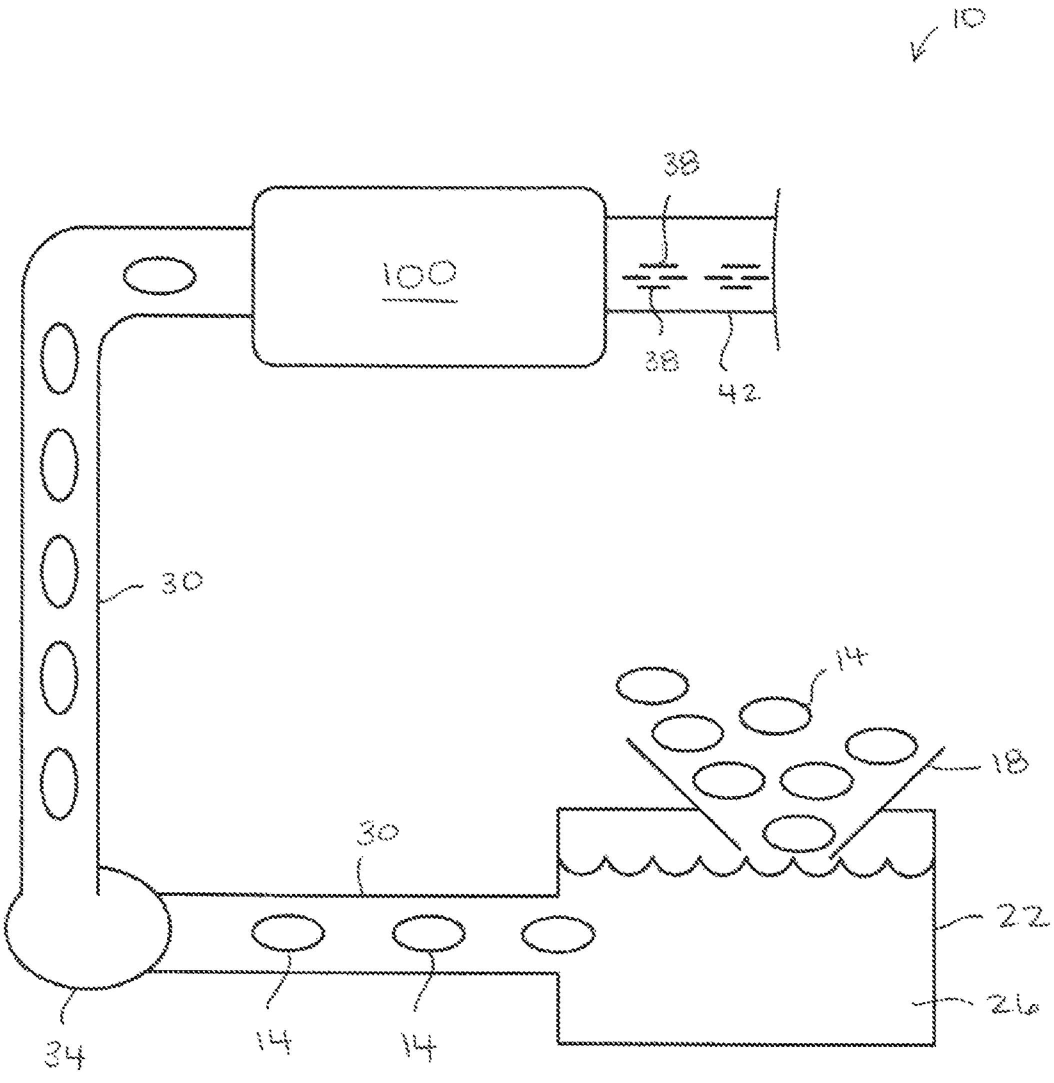
FIG. 1 is a schematic illustration of a hydraulic cutting system, in accordance with an embodiment.

In one aspect, a blade assembly for cutting food is provided. The blade assembly includes a blade support frame, and a plurality of V-shaped blades. The blade support frame may have an upstream end, a downstream end, a food flow path extending from the upstream end to the downstream end, and a plurality of blade mounts distributed around the food flow path. The plurality of V-shaped blades may be removably fastened to the blade support frame. Each V-shaped blade may have a first end portion connected to one of the blade mounts, a second end portion connected to another of the blade mounts, and an intermediate portion extending from the first end portion to the second end portion, the intermediate portion extending into the food flow path. Each V-shaped blade may include an upstream edge and a downstream edge. The upstream and downstream edges may each extend from the first end portion to the second end portion, and at the first and second end portions of each V-shaped blade, a respective one of the blade mounts may overlie both the upstream edge and the downstream edge of the V-shaped blade to inhibit the V-shaped blade from rotating when impacted by food.

In another aspect, a blade assembly for cutting food is provided. The blade assembly may include a blade support frame, and a plurality of V-shaped blades. The blade support frame may have an upstream end, a downstream end, a food flow path extending from the upstream end to the downstream end, and a plurality of blade mounts distributed around the food flow path. The plurality of V-shaped blades may be removably fastened to the blade support frame. Each V-shaped blade may have a first end portion connected to one of the blade mounts, a second end portion connected to another of the blade mounts, and an intermediate portion extending from the first end portion to the second end portion, the intermediate portion extending into the food flow path. Each of the first and second end portions of each V-shaped blade may be removably fastened to a respective one of the blade mounts by at least two spaced apart removable fasteners to inhibit the V-shaped blade from rotating when impacted by food.

In another aspect, a blade assembly for cutting food is provided. The blade assembly may include a blade support frame, and a plurality of V-shaped blades. The blade support frame may have an upstream end, a downstream end, a food flow path extending from the upstream end to the downstream end, and a plurality of blade mounts distributed around the food flow path. The plurality of V-shaped blades may be removably fastened to the blade support frame. Each V-shaped blade may have a first end portion connected to one of the blade mounts, a second end portion connected to another of the blade mounts, and an intermediate portion extending from the first end portion to the second end portion, the intermediate portion extending into the food flow path. Each of the first and second end portions of each V-shaped blade may be removably fastened to a respective one of the blade mounts by at least one mounting pin and at least one removable fastener to inhibit the V-shaped blade from rotating when impacted by food.

In another aspect, a method of cutting a food product into V-shaped pieces is provided. The method may include:

A method of cutting a food product into V-shaped pieces, the method comprising:

- propelling a food product downstream towards a blade assembly, the blade assembly comprising a plurality of V-shaped blades, each of the plurality of V-shaped blades having a first end portion, a second end portion, and an unsupported intermediate portion, wherein the unsupported intermediate portion is located in a food flow path of the blade assembly;
- impacting the intermediate portions of the V-shaped blades with the food product, wherein each first end portion and each second end portion is removably fastened to a respective blade mount adapted to inhibit the V-shaped blade from rotating when impacted by the food product; and
- moving the food product to a downstream end of the food flow path, whereby the intermediate portion of the plurality of V-shaped blades cut the food product into the V-shaped pieces.

DESCRIPTION OF VARIOUS EMBODIMENTS

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", "joined", "affixed", or "fastened" where the parts are joined or operate together either directly or indirectly (i.e., through one or more intermediate parts), so long as a link occurs. As used herein and in the claims, two or more parts are said to be "directly coupled", "directly connected", "directly attached", "directly joined", "directly affixed", or "directly fastened" where the parts are connected in physical contact with each other. As used herein, two or more parts are said to be "rigidly coupled", "rigidly connected", "rigidly attached", "rigidly joined", "rigidly affixed", or "rigidly fastened" where the parts are coupled so as to move as one while maintaining a constant orientation relative to each other. None of the terms "coupled", "connected", "attached", "joined", "affixed", and "fastened" distinguish the manner in which two or more parts are joined together.

Some elements herein may be identified by a part number, which is composed of a base number followed by an alphabetical or subscript-numerical suffix (e.g. 110*a*, or $\mathbf{110}_1$). Multiple elements herein may be identified by part numbers that share a base number in common and that differ by their suffixes (e.g. $\mathbf{110}_1$, $\mathbf{110}_2$, and $\mathbf{110}_3$). All elements with a common base number may be referred to collectively or generically using the base number without a suffix (e.g. 110).

For clarity of illustration, the description below refers to potatoes as the food product being cut. However, it will be appreciated that embodiments of the blade assembly described herein may be used to cut any suitable food, including without limitation fruit and vegetables. Accordingly, wherever reference is made to potatoes, it is expressly contemplated that the potatoes may be substituted by another suitable food product. In various embodiments, the blade assembly may be used to cut dense vegetables, such as tubers and root vegetables.

FIG. 1 shows a schematic view of a hydraulic cutting system 10, in accordance with at least one embodiment. In the example shown, potatoes 14 are fed from a hopper 18 into a tank 22 in which potatoes 14 are submersed in water 26. As shown, conduits 30 may connect tank 22 to a pump 34, and connect pump 34 to a blade assembly 100.

In some embodiments, pump 34 circulates water 26 from tank 22 to thereby entrain potatoes 14 to travel through conduits 30 to blade assembly 100. In some examples, conduits 30 are sized to receive potatoes 14 in single file. For example, conduits (e.g. pipes) 30 may have a diameter that is greater than a diameter of potatoes 14, and less than the diameter of two potatoes 14.

In the example shown, potatoes 14 travel through conduits 30 toward blade assembly 100 at a velocity imparted to them by pump 34. Several embodiments of blade assembly 100 are described in detail below. As potatoes 14 travel through blade assembly 100, potatoes 14 are cut into smaller potato pieces 38 and discharged through outlet conduit 42. Optionally, potato pieces 38 may be subjected to downstream processing, such as for example cooking, panfrying, freezing, packaging, or combinations thereof.

Figure 2:
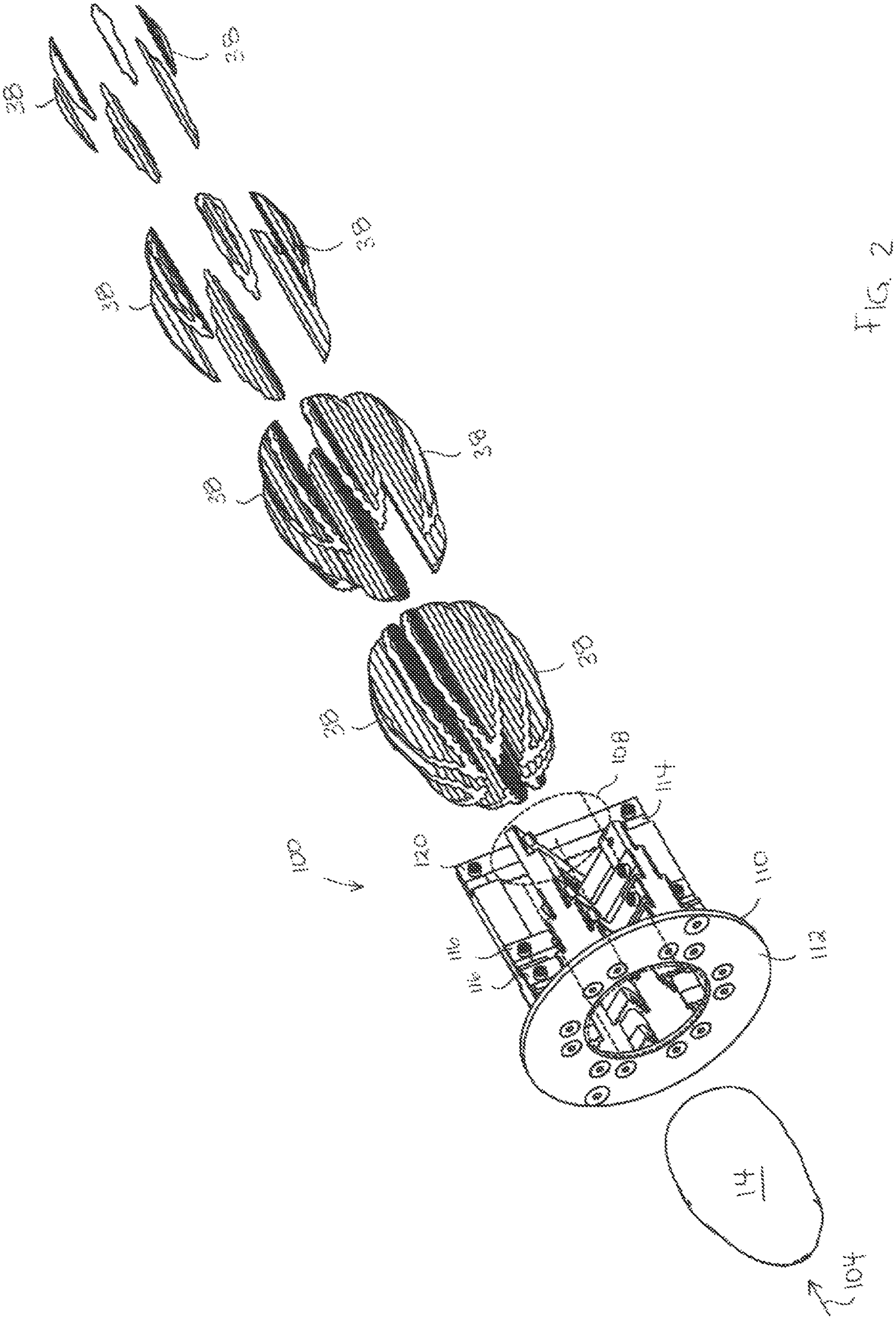
FIG. 2 is a perspective view of a blade assembly, a whole potato, and cut potato pieces, in accordance with an embodiment.

Reference is now made to FIG. 2, which shows a whole potato 14 upstream of blade assembly 100, and a cut potato pieces 38 downstream of blade assembly 100. Potato 14 and potato pieces 38 are traveling in a downstream direction 104 along a food flow path that extends through blade assembly 100, whereby the blades of blade assembly 100 cut potato 14 into potato pieces 38.

As shown, blade assembly 100 includes a blade support frame 110 to which a plurality of blades 116, 120 are mounted. Blade support frame 110 extends from a frame upstream end 112 to a frame downstream end 114. Food flow path 108 extends through blade assembly 100 from frame upstream end 112 to frame downstream end 114. Blades 116, 120 extend into the food flow path 108 so that they cut through potatoes 14 traveling downstream along food flow path 108 through blade assembly 100.

As used herein and in the claims, the term "axially" refers to a direction parallel to downstream direction 104. For example, a first part described as being "axially aligned" with a second part is aligned with the second part in a direction parallel to downstream direction 104. Two parts described as having different "axial positions" are positioned at different locations in a direction parallel to downstream direction 104 (e.g. one downstream of the other) and the two parts may or may not be axially aligned with each other.

Figure 3:
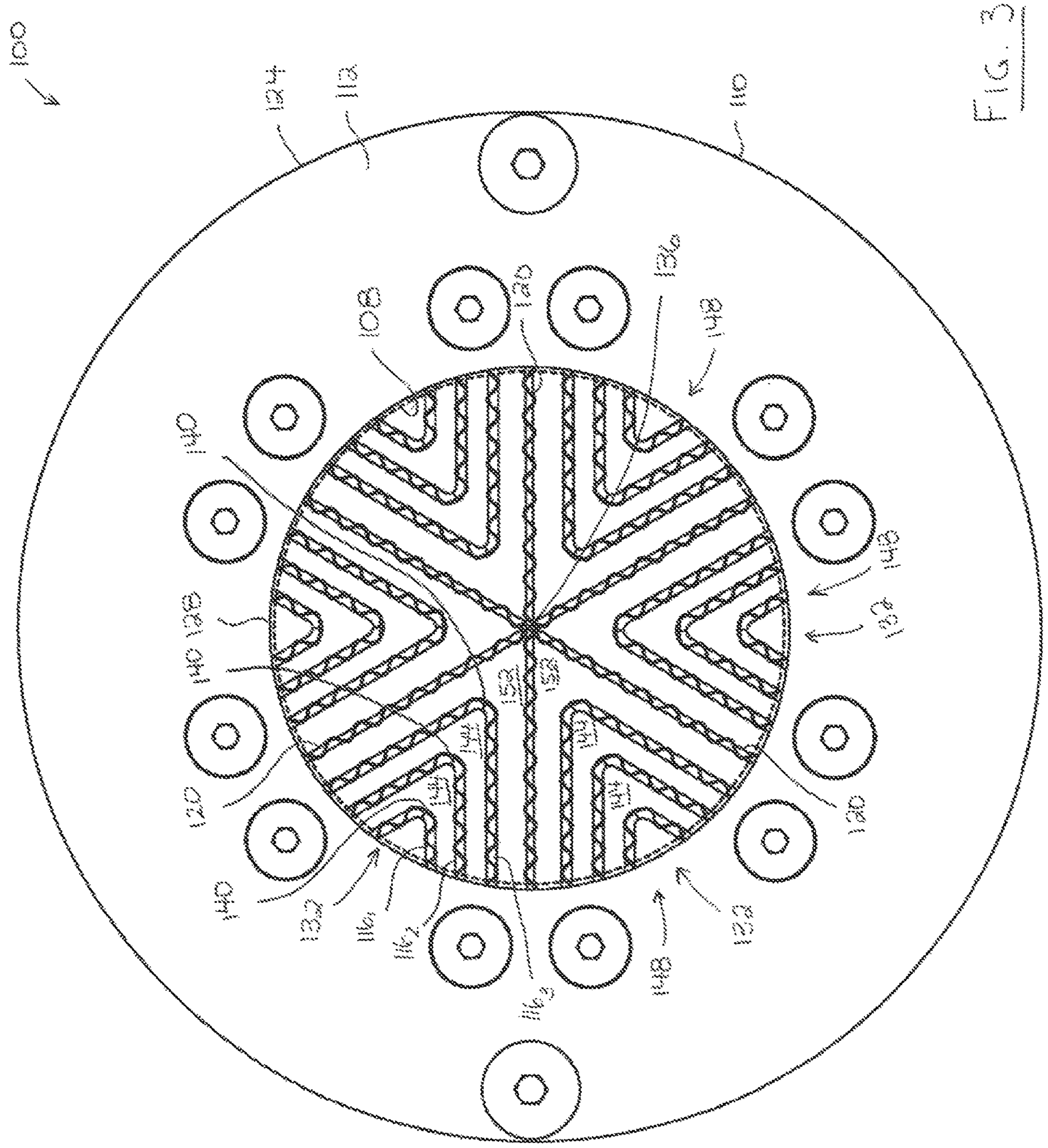
FIG. 3 is a front view of the blade assembly of FIG. 2

FIG. 3 is a front view of blade assembly 100 looking in a downstream direction aligned with the food flow path. As shown, blade support frame 110 may include a base 124 at frame upstream end 112. Base 124 may include a flow opening 128 that borders (e.g. surrounds) the food flow path through blade assembly 100. Blade assembly 100 may include a plurality of V-shaped blades 116, and optionally one or more additional blades 120. As shown, V-shaped blades 116 may be arranged into several blade groups 132 that are circumferentially distributed about flow path centerline 136. Within a blade group 132, V-shaped blades 116 may be radially nested. For example, each V-shaped blade 116 may include a blade apex 140 at a radially innermost end of the blade 116, and the blade apexes 140 of the V-shaped blades 116 within a blade group 132 may be radially spaced apart (i.e. located at different radial distances from flow path centerline 136).

As shown, blade apexes 140 within a blade group 132 may also be radially aligned (i.e. they may be positioned on a common imaginary radius line extending from flow path centerline 136). This may provide symmetry to the cuts made by the V-shaped blades 116 within a blade group 132. In alternative embodiments, blade apexes 140 within a blade group 132 may not be radially aligned. This may allow the V-shaped blades 116 within a blade group 132 to make uneven cuts, which may give the cut potato pieces a rustic, home-style character.

Still referring to FIG. 3, the profile spaces 144 between blades 116, 120 when viewed axially (i.e. parallel to the downstream direction) define the shapes of the potato pieces that are cut by blade assembly 100. As shown, radially adjacent V-shaped blades 116 within a blade group 132 may define a V-shaped profile space 144, whereby a potato cut by these blades 116 will produce a V-shaped potato piece. V-shaped potato pieces may be useful to dip condiments.

As shown, blade groups 132 may be spaced apart circumferentially about flow path centerline 136. Blade assembly 100 may include any number of blade groups 132. In the illustrated example, blade assembly 100 includes 6 blade groups. In other embodiments, blade assembly 100 may include, for example 3 to 20 blade groups.

Figure 4:
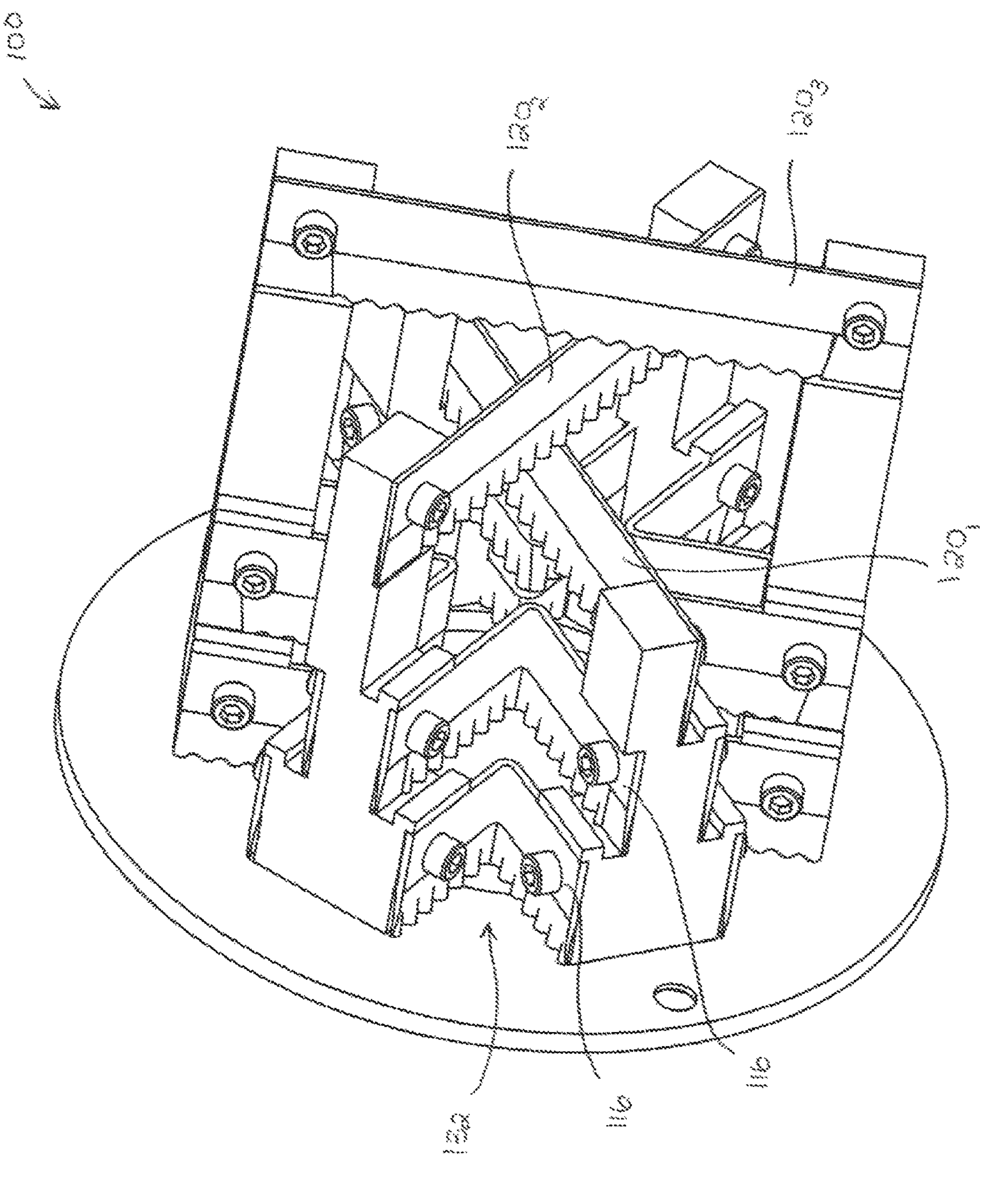
FIG. 4 is a perspective view of a blade assembly in accordance with another embodiment.

Each blade group 132 may include any number of V-shaped blades 116. It will be appreciated that for a given flow path diameter, a greater number of V-shaped blades 116 within a blade group 132 will produce V-shaped potato pieces that are greater in number and thinner, all else being equal. In the illustrated embodiment, blade assembly 100 includes three V-shaped blades 116 per blade group 132. In other embodiments, blade assembly 100 may include fewer V-shaped blades 116 per blade group 132 (e.g. 1 or 2), or a greater number of V-shaped blades 116 per blade group (e.g. 4 to 20). FIG. 4 shows an embodiment of blade assembly 100 including two V-shaped blades 116 per blade group 132.

Still referring to FIG. 3, each blade group 132 may include the same number of V-shaped blades 116 as shown or a different number of V-shaped blades 116. In the illustrated example, each blade group 132 is substantially identical to each other blade group 132. In other embodiments, one or more (or all) of blade groups 132 may be different in one or many respects (e.g. shape, size, cutting edge configurations, orientation, number of blades, arrangement of blades, shape of blades, or size of blades) from one or more (or all) other blade groups 132.

In some embodiments, blade assembly 100 may include one or more blades 120. As shown, a blade 120 may be a straight blade (i.e. as opposed to a blade having an intermediary corner, like V-shaped blades 116) that extends clear across food flow path 108. For example, a blade 120 may intersect flow path centerline 136, and thereby bisect food flow path 108. Alternatively, a blade 120 may be spaced apart from food flow path centerline 136. In the illustrated example, there are one half as many blades 120 as there are blade groups 132, and blades 120 intersect each other at flow path centerline 136, whereby blades 120 divide the food flow path into sectors 148 (e.g. pie-shaped sectors as shown).

Each blade group 132 may be located within a different one of the flow path sectors 148. When blade assembly 100 is viewed axially in profile (e.g. as in FIG. 3), each blade group 132 may be spaced apart from the straight blades 120 that border the flow path sector 148 in which that blade group 132 is located. Consequently, a V-shaped profile space 152 may be defined by the innermost blade 116 of each blade group 132, and the blades 120 that border the flow path sector 148 in which that blade group 132 is located. Accordingly, the V-shaped blades 116 and straight blades 120 may cooperate to define additional V-shaped profile spaces 152, whereby a potato cut by these blades 116, 120 will produce additional V-shaped potato pieces.

In some embodiments (including any embodiment described herein, such as for example in connection with FIGS. 4, 6, 7, 9, and 10), blades 120 may be interleaved. For example, blade $\mathbf{120_2}$ may include a slot that receives a portion of blade $\mathbf{120_1}$, and blade $\mathbf{120_3}$ may include a slot that receives a portion of blade $\mathbf{120_2}$. Interconnecting blades 120 in this manner may help improve the structural rigidity of blades 120.

In alternative embodiments, blade assembly 100 may not include straight blades 120. For example, blade assembly 100 may instead include additional (e.g. three additional) V-shaped blades 116 having blade apexes 140 that meet (e.g. at flow path centerline 136). Such V-shaped blades may have any concave shape described herein, such as for example those shapes described below in connection with FIG. 15B.

Figure 5:
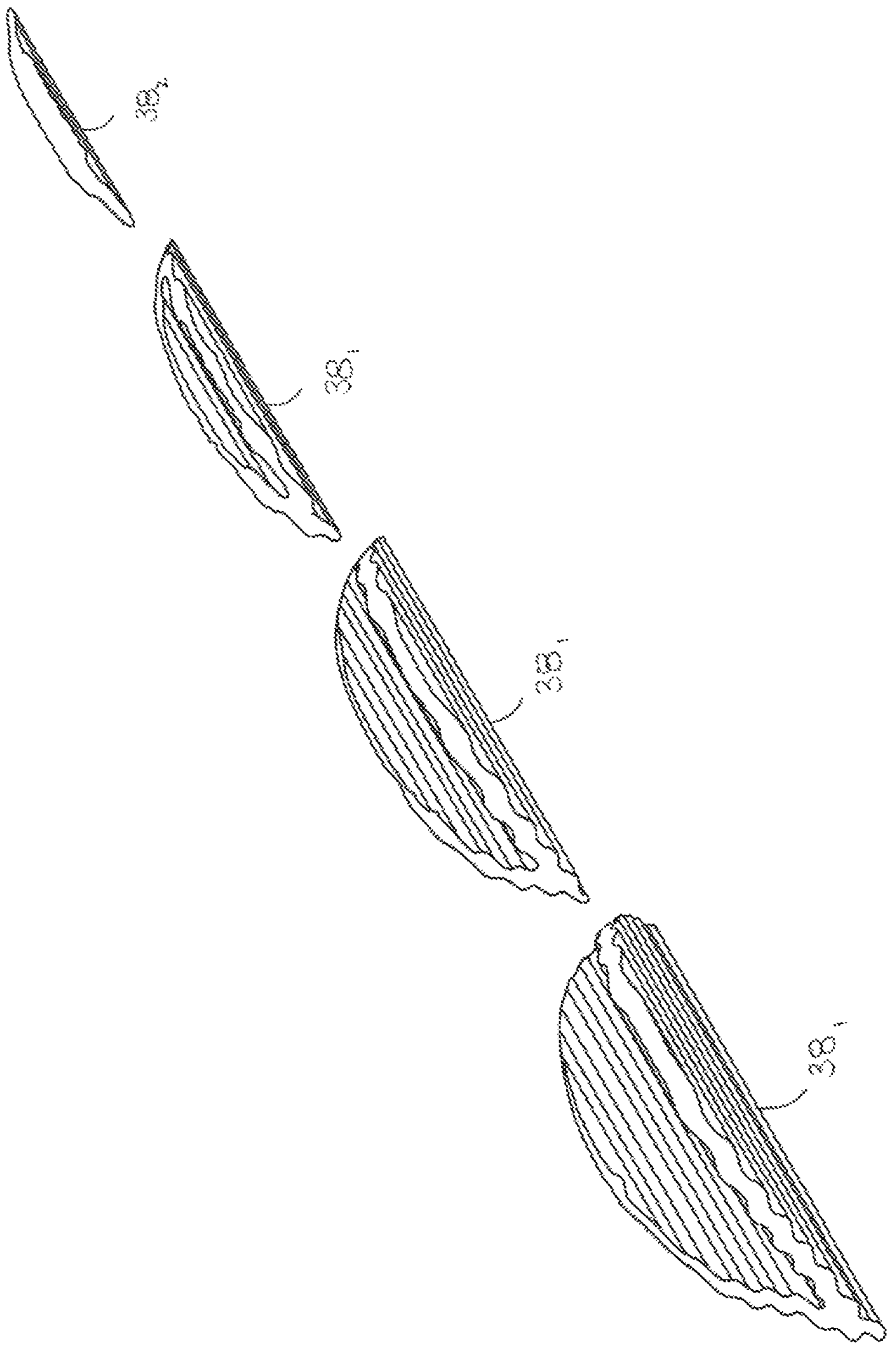
FIG. 5 is a perspective view of cut potato pieces cut by one group of blades in the blade assembly of FIG. 2.

Reference is now made to FIGS. 3 and 5. The illustration shows potato pieces 38 cut by blades 116, 120 (FIG. 3) associated with one flow path sector 148. As shown, potato pieces 38 include V-shaped potato pieces $\mathbf{38_1}$ that were cut by radially adjacent blades 116, 120 and one wedge-shaped potato piece $\mathbf{38_2}$ that was cut by the radially outermost blade 116 of the blade group 132.

Figure 6:
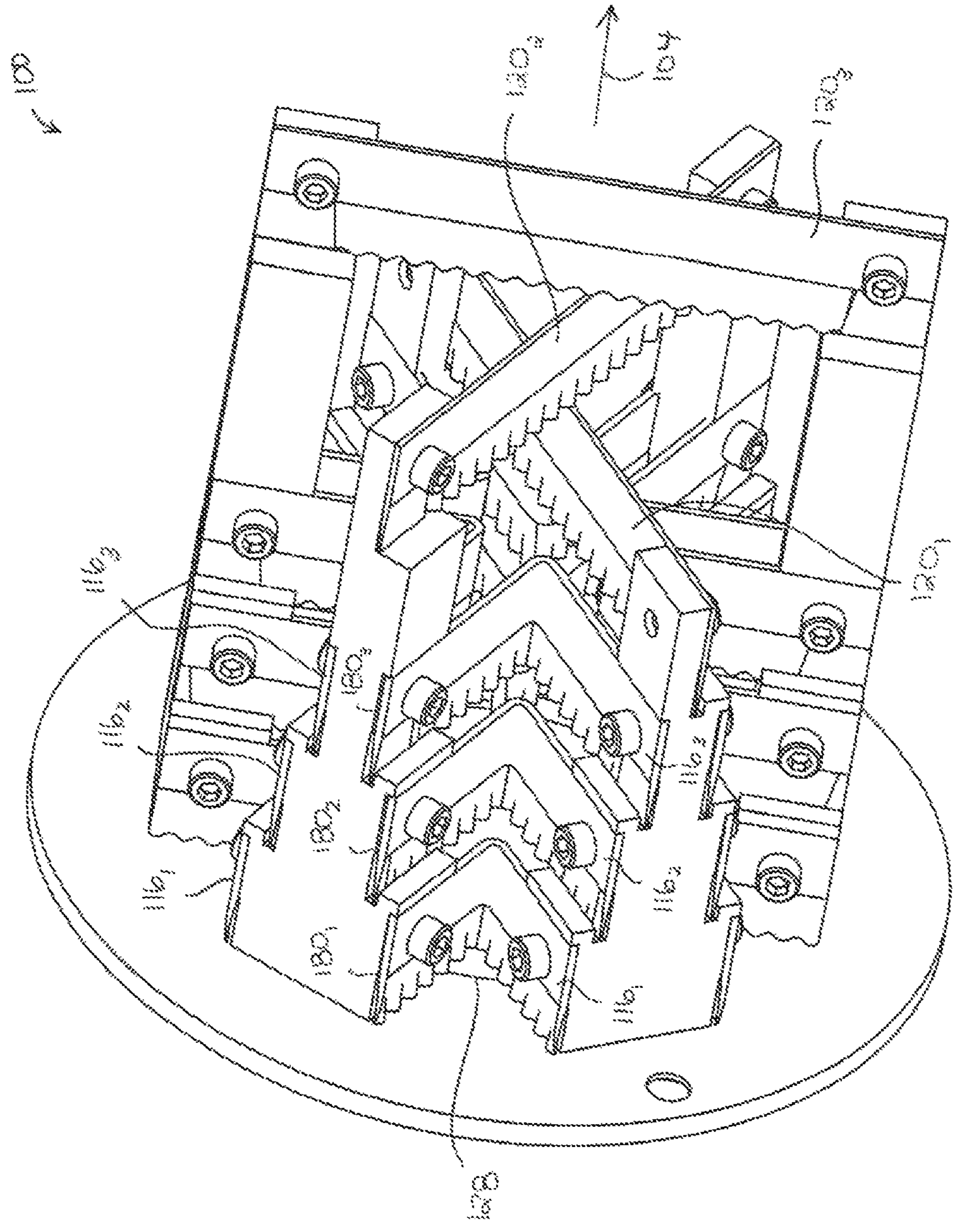
FIG. 6 is a perspective view of the blade assembly of FIG. 2.
Figure 7:
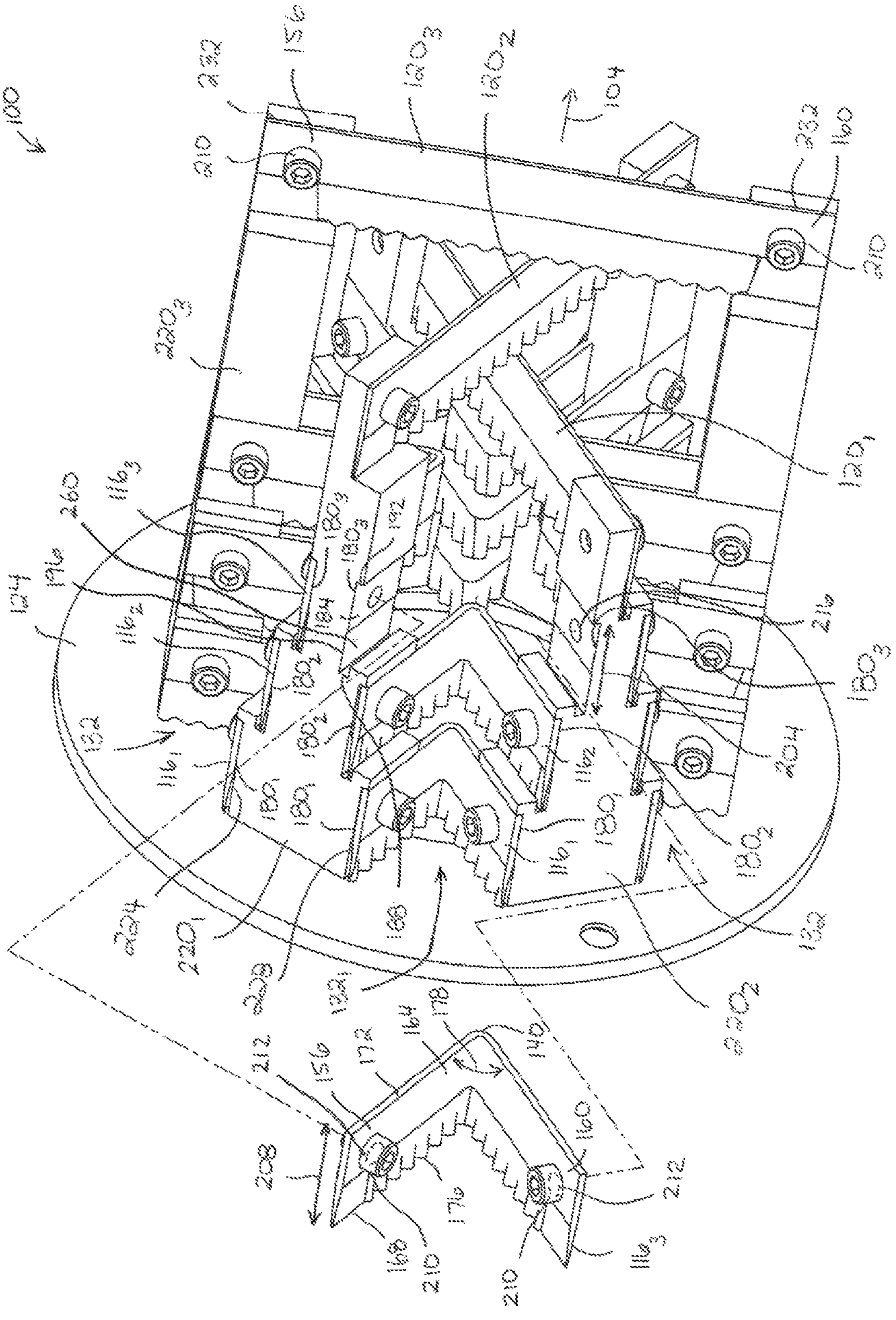
FIG. 7 is a partially exploded view of the blade assembly of FIG. 2.
Figure 8:
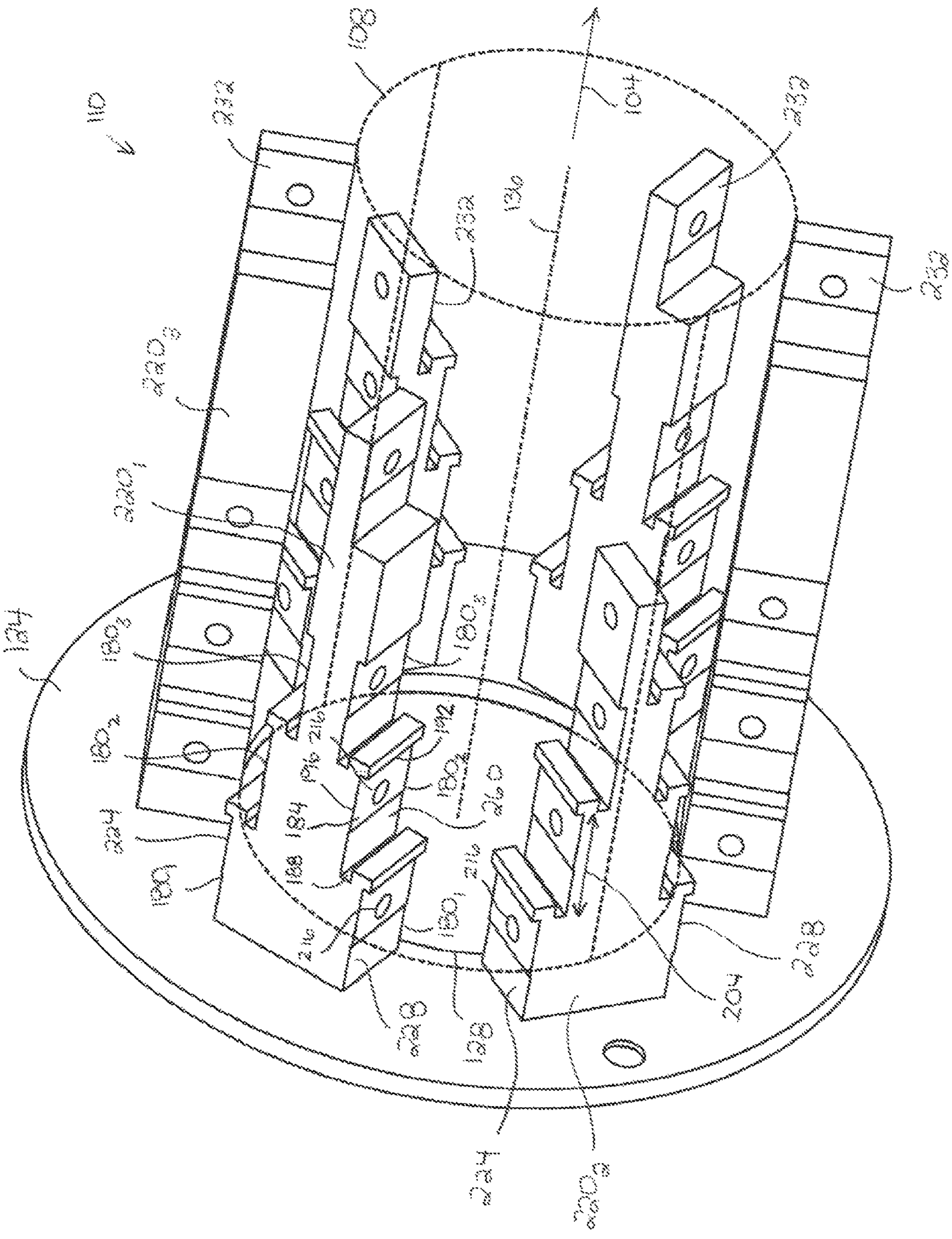
FIG. 8 is a perspective view of the blade support frame of the blade assembly of FIG. 2.

Turning to FIGS. 6-8, each V-shaped blade 116 may include a first end portion 156, a second end portion 160, and an intermediate portion 164 that joins the first end portion 156 to the second end portion 160. As shown, intermediate portion 164 may include a corner (e.g. a sharp or rounded bend) at a blade apex 140. Each V-shaped blade 116 also includes an upstream edge 168 and a downstream edge 172 (also referred to as an upstream edge 168 and a downstream edge 172). Each of the upstream edge 168 and the downstream edge 172 extend from the first end portion 156, across the intermediate portion 164 to the second end portion 160. As shown, the upstream edge 168 includes a blade edge 176 that makes first contact with potatoes traveling downstream along food flow path 108 (FIG. 8). The blade edge 176 of each V-shaped blade 116 may have any profile suitable for cutting food into pieces, such as a wavy edge profile as shown, a straight edge profile, a crinkled edge profile, or a corrugated edge profile.

The intermediate portion 164 of each V-shaped blade 116 may define an inside angle 178 of less than 135 degrees. Preferably, inside angle 178 is acute (i.e. less than 90 degrees), such as for example, 10-85 degrees. This may cut V-shaped potato pieces that perform well at holding toppings (e.g. salsa, cheese, sour cream, or ketchup), and that are also relatively narrow and therefore easy to eat (i.e. fit into one's mouth). In the illustrated example, inside angle 178 is approximately 60 degrees.

Figure 15C:
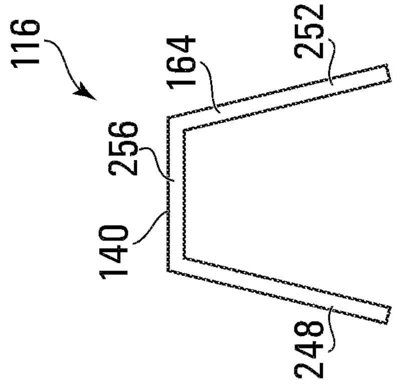
FIGS. 15A-C are plan views of cutting blades in accordance with various embodiments.
Figure 15B:
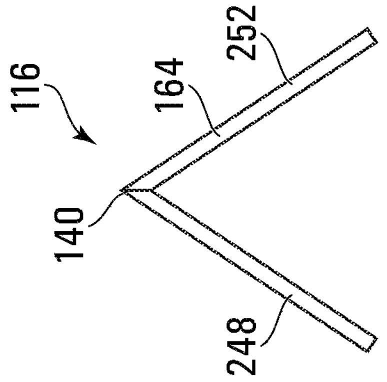
Figure 15A:
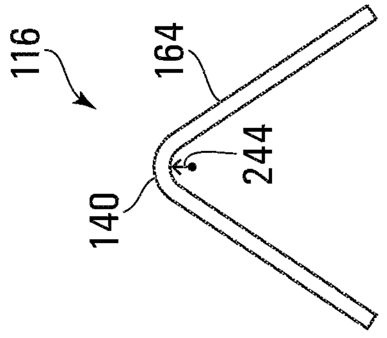

Intermediate portion 164 may have any concave shape. FIG. 15A shows an example in which intermediate portion 164 includes a curved blade apex 140, with a radius of curvature 244. FIG. 15B shows an example in which intermediate portion 164 includes a sharp apex 140 (i.e. not curved) where first and second blade segments 248, 252 meet. FIG. 15C shows an example in which intermediate portion 164 includes a squared apex 140, in which a straight blade segment 256 joins first and second blade segments 248, 252. In some embodiments, all blades 116 may have the same concave shape. This allows the blade assembly to cut potato pieces having the same profile shape on the inside and outside surfaces. Alternatively, some of blades 116 may include different concave shapes from other blades 116. For example, radially adjacent blades 116 may have different concave shapes. This allows the blade assembly to cut potato pieces having different profile shapes on the inside and outside surfaces Blade support frame 110 includes a plurality of blade mounts 180 located outside of food flow path 108 (e.g. radially outward of base flow opening 128). To each blade mount 180 is removably fastened an end portion 156, 160 of a V-shaped blade 116. As shown, the first and second end portions 156, 160 of a V-shaped blade 116 may be fastened to respective blade mounts 180 at locations radially outside of food flow path 108, with the intermediate portion 164 extending into the food flow path 108 to cut passing potatoes.

The intermediate portion 164 of each V-shaped blade 116 may be unsupported within food flow path 108. That is, there may be no elements of blade assembly 100, within food flow path 108, that are in contact with intermediate portion 164. Indeed, there may be no elements of blade assembly 100, within food flow path 108, that are contact with any portion of V-shaped blade 116. As shown in FIG. 3, this allows the spaced apart blades 116, 120 within a blade group 132 to define V-shaped profile spaces 144, 152 that produce V-shaped potato pieces whose concavity makes them so well suited to holding toppings (e.g. salsa, cheese, sour cream, or ketchup).

However, when an unsupported intermediate portion 164 is struck repeatedly by dense vegetables, such as potatoes, the V-shaped blade 116 will suffer torsional loads at first and second end portions 156, 160 where the V-shape blade 116 is mounted to blade support frame 110. The torsional loads are greatest when the blade angle 178 is small. For example, V-shaped blades 116 may experience significant torsional loads from the impact of potatoes when they have acute blade angles 178 (i.e. less than 90 degrees).

The torsional loads will urge V-shaped blades 116 to rotate in the downstream direction 104. If that happens, then the V-shaped blades 116 will become misaligned with the downstream direction 104. For example, a rotated V-shaped blade 116 may extend from a blade upstream edge 168 to a blade downstream edge 172 in a direction that is not parallel with to downstream direction 104. In this rotated orientation, the V-shaped blade 116 may be unable to make clean cuts, and may instead obliterate passing potatoes such that the cut potatoes are unusable.

In the context of a high-speed hydraulic cutting system 10 (FIG. 1), V-shaped blades 116 of blade assembly 100 may cut through thousands of potatoes per day. Accordingly, V-shaped blades 116 may frequently become dull and damaged, and may therefore require routine repair or replacement. It would be cost prohibitive to replace the entire blade assembly 100 each time individual V-shaped blades 116 become dull or damaged (e.g. daily). Therefore, it is important that V-shaped blades 116 are removably fastened to blade support frame 110. In other words, permanently connecting V-shaped blades 116 to blade support frame 110 (e.g. by welds or by integrally forming blades 116 with frame 110) does not provide an effective solution to the problem of V-shaped blades 116 rotating out of alignment with the downstream direction 104 from the repeated impact of potatoes.

Embodiments herein are directed to a blade assembly 100 including a blade support frame 110 with blade mounts 180 designed to provide greater torsional rigidity to connected V-shaped blades 110, which reduces the likelihood of the V-shaped blades 110 rotating in the downstream direction 104 when struck by potatoes. This facilitates blade assembly 100 equipped with V-shaped blades 116 having unsupported intermediate portions 164 to be used in a high-speed hydraulic cutting system 10 (FIG. 1) to cut potatoes into potato pieces (e.g. V-shaped potato pieces) on an industrial scale.

Referring to FIGS. 7-8, each blade mount 180 may include a recess 184 in blade support frame 110. A blade end portion 156, 160 may be received in each recess 184 when fastened to the associated blade mount 180. When a blade end portion 156, 160 is received in a recess 184, the blade mount 180 may overlie both of the upstream and downstream edges 168, 172 of the blade end portion 156, 160. Consequently, the blade mount 180 may interfere with the V-shaped blade 116 rotating in a downstream direction from the impact of passing potatoes. For example, such rotation would be inhibited by contact between blade mount 180 and both the upstream and downstream edges 168, 172.

As shown, a blade mount 180 may include an upstream portion 188, a downstream portion 192, and an intermediate portion 196 which extends from the upstream portion 188 to the downstream portion 192. The portions 188, 192, 196 may border (e.g. define) the blade mount recess 184. Mount upstream portion 188 may axially oppose mount downstream portion 192. The mount upstream portion 188 may overlie the upstream edge 168 of a V-shaped blade end portion 156, 160, and the mount downstream portion 192 may overlie the downstream edge 172 of the V-shaped blade end portion 156, 160. That is, the mount upstream portion 188 may be located upstream of blade upstream edge 168, and axially align with blade upstream edge 168. Similarly, mount downstream portion 192 may be located downstream of blade downstream edge 172, and axially align with blade downstream edge 172. As shown, mount upstream portion 188 and downstream portion 192 may project circumferentially of intermediate portion 196 to define blade mount recess 184 in which a blade end portion 156, 160 is received. If V-shaped blade 116 was urged to rotate towards downstream direction 104, the rotation would be obstructed by contact between mount upstream portion 188 and blade upstream edge 168, and by contact between mount downstream portion 192 and blade downstream edge 172.

In some embodiments, a mount upstream portion 188 may be formed by base 124. For example, blade mounts $\mathbf{180}_1$ are shown having an upstream portion 188 formed by frame base 124.

The amount of play (e.g. wiggle) between blade mount recess 184 and a connected V-shaped blade 116 may depend on spacings between the blade upstream and downstream edges 168, 172 and the overlying mount portions 188, 192 respectively. Preferably, there is little or no spacing between overlying portions 188, 192 and blade edges 168, 172, so that blade end portions 156, 160 make contact with overlying portions 188, 192 (and thereby inhibit further blade rotation) after the V-shaped blade 116 has rotated very little (or none at all).

In some embodiments, a small clearance (e.g. less than 1 mm) lies between overlying portions 188, 192 and the blade upstream and downstream edges 168, 172 of a blade end portion 156, 160 to make it easier to insert and remove the blade end portion 156, 160 from the blade mount recess 184. For example, recess may have a recess width 204, measured (parallel to downstream direction 104) from upstream portion 188 to downstream portion 192 that is slightly (e.g. 0.01 mm to 1 mm) greater than axial blade width 208, measured at blade end portion 156, 160 from blade upstream edge 168 to blade downstream edge 172.

In alternative embodiments, recess width 204 may be equal to axial blade width 208 at a blade end portion 156, 160. This provides physical contact between blade mount portions 188, 192 and blade edges 168, 172 at all times, whereby any and all rotations of V-shaped blade 116 in the downstream direction 104 may be inhibited by blade mount 180. In this case, a user may insert and remove blade end portions 156, 160 into blade mount recesses 184 with a tool such as a hammer or pliers.

A V-shaped blade 116 may be fastened to blade mounts 180 in any manner that allows the V-shaped blade 116 to be removed for repair or replacement, and a new or repaired blade 116 refastened to the blade mounts 180. For example, V-shaped blades 116 may be fastened to blade mounts 180 by a removable fastener 210. Removable fastener 210 may be, for example a threaded fastener (e.g. a bolt as shown, a screw, or a nut), a clamp, or a dowel with linchpin. In the illustrated embodiment, each blade end portion 156, 160 has a fastener aperture 212 that aligns with a fastener aperture 216 of a blade mount 180, and a removable fastener 210 extends through both apertures 212, 216 to removably fasten the blade end portion 156, 160 to the blade mount 180. As shown, fastener aperture 216 may be formed in mount intermediate portion 196, whereby the removable fastener 210 when inserted may be oriented transverse (e.g. perpendicular) to downstream direction 104.

In some embodiments, a fastener 210 may, in addition to fastening a V-shaped blade 116 to a blade mount 180, contribute to inhibiting the V-shaped blade 116 from rotating in the downstream direction 104. For example, fastener 210 may cooperate with one or both of mount portions 188, 192 to obstruct the V-shaped blade 116 from rotating in downstream direction 104. In some embodiments, blade mount 180 may include only one of mount portions 188 or 192 that axially align with a respective blade edge 168 or 172. For example, fastener 210 and the one mount portion 188 or 192 may together inhibit the V-shaped blade 116 from rotating in downstream direction 104 when V-shaped blade 116 is impacted by food.

Blade support frame 110 can include any arrangement of blade mounts 180 suitable for removable fastening of V-shaped blade end portions 156, 160. For example, all of blade mounts 180 of blade support frame 110 may be located at the same axial location. This may provide a compact configuration with a relatively small axial width dimension.

Alternatively, the illustrated embodiment includes blade mounts 180 axially distributed. This allows blade support frame 110 to carry blades 116 that are axially staggered. This may reduce the number of blades 116 which pierce a potato at one time. Without being limited by theory, it is believed that a blade 116 experiences a spike in resistive force at the moment when the blade 116 first pierces the potato. By having blades 116 pierce a potato in a staggered or sequential manner (e.g. one subset of blades after another subset of blades, and so forth), blade assembly 100 may experience a lower peak-force during the cutting of that potato. This may reduce incidences of blade damage and other general wear on blade assembly 100.

In some embodiments, blade mounts 180 may include a depression 260 located proximate upstream portion 188. Depressions 260 may provide clearance for blade edges 176 having a profile that extends out of plane. For example, depressions 260 may accommodate blade edges 176 having a wavy, crinkled, or corrugated edge profile. Alternatively, blade mounts 180 may not include depressions 260. For example, blade assembly 100 may include blade edges 176 having straight edge profiles, which may not extend out of plane, thereby making depressions 260 unnecessary.

Still referring to FIGS. 7-8, blade support frame 110 may include a plurality of blade support risers 220 which extend downstream from frame base 124. Blade support risers 220 may be distributed around flow path centerline 136 outside of food flow path 108. As shown, each blade support riser 220 may include a plurality of blade mounts 180. The blade mounts 180 of a blade support riser 220 may be axially staggered. In the illustrated example, blade support risers 220 include first blade mounts $180_1$ located upstream from second blade mounts $180_2$, which are located upstream from third blade mounts $180_3$. In other embodiments, blade support risers 220 may include greater or fewer blade mounts 180 arranged at the same or different axial positions.

In the illustrated embodiment, each blade mount 180 of a blade support riser 220 may not be axially aligned with any other blade mount 180 of that blade support riser 220 (or indeed any blade support riser 220). For example, each blade mount 180 may be offset, in direction(s) perpendicular to downstream direction 104, from each other blade mount 180. This allows blade support risers 220 to hold blades 116 in spaced apart relation when viewed axially in profile (e.g. as in FIG. 3). This may avoid two blades 116 making the same cut. In other embodiments, blade mounts 180 may be axially aligned, and instead blades 116 may extend in different directions from the axially aligned blade mounts 180 so that they avoid making duplicate cuts.

Still referring to FIGS. 7-8, in some embodiments, each V-shaped blade 116 may be fastened to two circumferentially adjacent blade support risers 220. For example, V-shaped blade $116_1$ is shown having a first end portion 156 removably fastened to blade mount $180_1$ of blade support riser $220_1$, and a second end portion 160 removably fastened to blade mount $180_1$ of blade support riser $220_2$. Blade support risers $220_1$ and $220_2$ are circumferentially adjacent. As shown, the V-shaped blades 116 of a blade group 132 may all be fastened to the same two circumferentially adjacent blade support risers 220. For example, V-shaped blades $116_1$, $116_2$, and $116_3$ of blade group $132_1$ are shown all removably fastened to blade support risers $220_1$ and $220_2$.

In some embodiments, a blade support riser 220 may include a first side 224, and an opposed second side 228. Each side 224, 228 may include a plurality of blade mounts 180. This may allow each blade support riser 220 to cooperate with both circumferentially adjacent blade support risers 220 to hold V-shaped blades 116. For example, blade support risers $220_1$ and $220_2$ are shown cooperating to hold three V-shaped blades 116, an blade support risers $220_1$ and $220_3$ are shown cooperating to hold another three V-shaped blades 116. This may reduce the number of blade support risers 220 required by blade support frame 110 to hold V-shaped blades 116, as compared with blade support risers 220 that have blade mounts 180 on only a single side.

As shown, each blade mount 180 on a first side 224 of a blade support riser 220 may be located at the same axial position as another blade mount 180 on a second side 228 of the blade support riser 220. For example, V-shaped blades $116_1$ fastened to first and second sides 224, 228 of blade support riser $220_1$ are shown having the same axial position. Similarly for V-shaped blades $116_2$ and $116_3$. As shown, the width of blade support riser $220_1$ may decrease stepwise from the axial position of blade mounts $180_1$ to the axial position of blade mounts $180_2$ to the axial position of blade mounts $180_3$ in order to provide offset mounting positions for blades 116.

In alternative embodiments, a blade support riser 220 may include blade mounts 180 on only one of the sides 224, 228 of the blade support riser 220. This may be the most appropriate configuration for the intended blade mounting pattern.

Still referring to FIGS. 7-8, blade support frame 110 may include additional mounts 232 for blades 120. In the illustrated example, blades 120 are straight blades that bisect the food flow path 108. As shown, each blade 120 has a first end portion 156 connected to one blade mount 232 and a second end portion 160 connected to another blade mount 232. For example, the blade mounts 232 carrying one blade 120 may be provided by radially opposed blade support risers 220 as illustrated. Because blades 120 are straight, unlike V-shaped blades 116, blades 120 do not face the problem of torsional loading experienced by V-shaped blades 116. Accordingly, it may not be required for blade mounts 232 to have features which inhibit blades 120 from rotating in the downstream direction 104. In the illustrated example, each blade 120 is removably fastened at its first and second end portions 156, 160 to blade mounts 232 by removable fasteners 210, which may the same or different from the fasteners 210 that fasten V-shaped blades 116 to blade support frame 110.

In some embodiments, blades 120 may be positioned offset from each other in the downstream direction 104, for the same reasons described above with respect to V-shaped blades 116. For example, the illustrated embodiment shows blade $\mathbf{120_1}$ located upstream of V-shaped blade $\mathbf{120_2}$, which is upstream of V-shaped blade $\mathbf{120_3}$.

Figure 9:
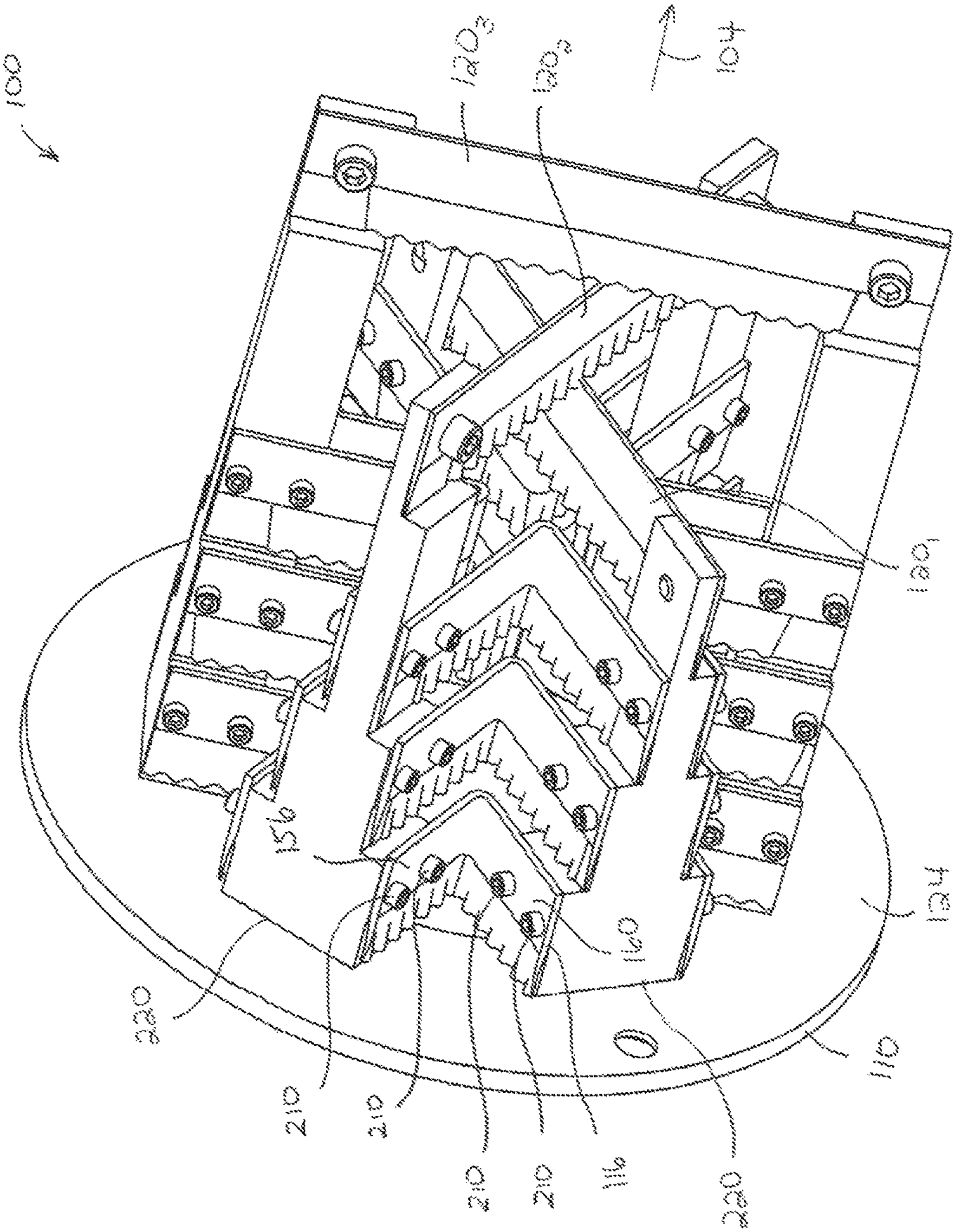
FIG. 9 is a perspective view of a blade assembly in accordance with another embodiment.
Figure 10:
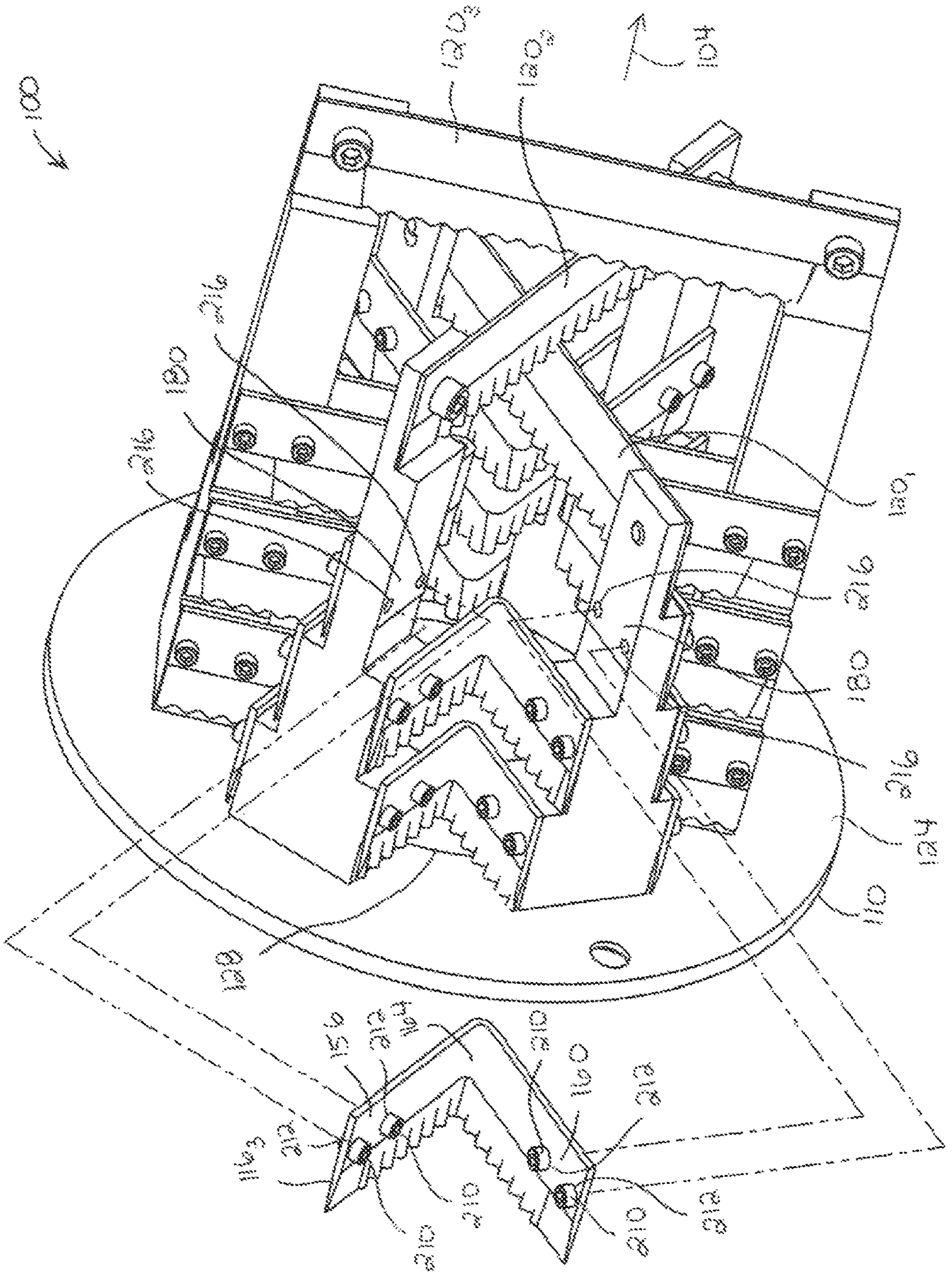
FIG. 10 is a partially exploded view of the blade assembly of FIG. 9.
Figure 11:
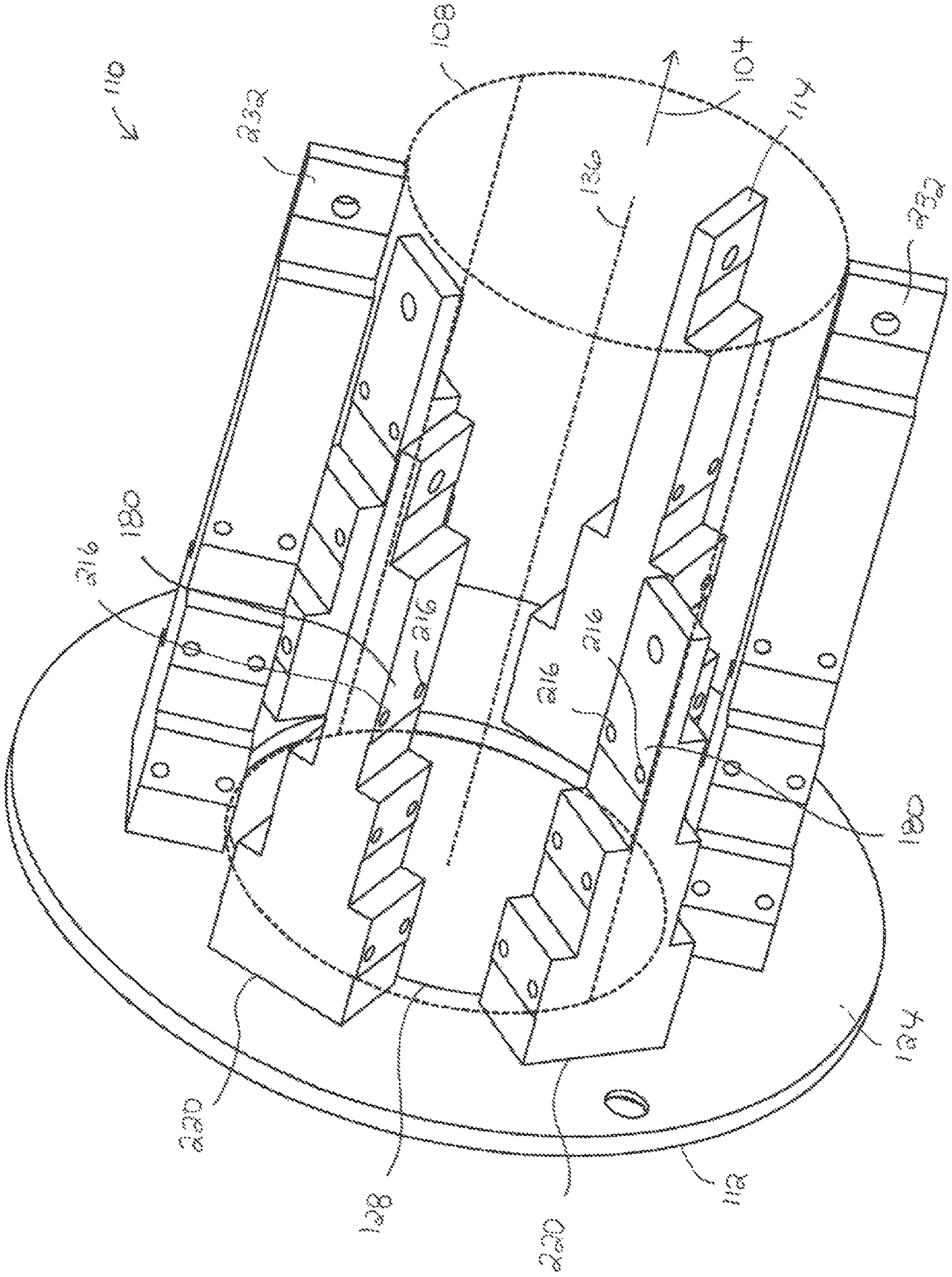
FIG. 11 is a perspective view of the blade support frame of the blade assembly of FIG. 9.

Reference is now made to FIGS. 9-11, which show another embodiment of blade assembly 100. As an alternative to (or in addition to) a blade mount recess 184 (FIG. 7), each V-shaped blade end portion 156, 160 may be removably fastened to a blade mount 180 by two or more removable fasteners 210. For example, V-shaped blade $\mathbf{116_3}$ is shown having end portions 156, 160, each of which is fastened to a respective blade mount $\mathbf{180_3}$ by two removable fasteners 210. Together, the two removable fasteners 210 may provide superior torsional stability as compared to one removable fastener 210, all else being equal. This design may have lower manufacturing cost and complexity as compared to a design that relies upon blade mount recesses for torsional stability. However, this design also requires additional fasteners 210, which may increase assembly costs. In some embodiments, blade assembly 100 may include blade mounts 180 with both blade mount recesses 184 (FIG. 7) and that support dual fasteners 210. This design may provide even greater torsional stability, all else being equal, albeit at greater manufacturing and assembly cost.

Each blade end portion 156, 160 may have two fastener apertures 212 that align with two corresponding fastener apertures 216 of a blade mount 180, and two removable fasteners 210 may extend through apertures 212, 216 to removably fasten the blade end portion 156, 160 to the blade mount 180. As shown, fastener apertures 216 may be spaced apart. In the illustrated example, fastener apertures 216 are radially spaced apart (i.e. they are positioned at different radial distances from flow path centerline 136). Alternatively or in addition, fastener apertures 216 may be axially spaced apart.

Figure 12:
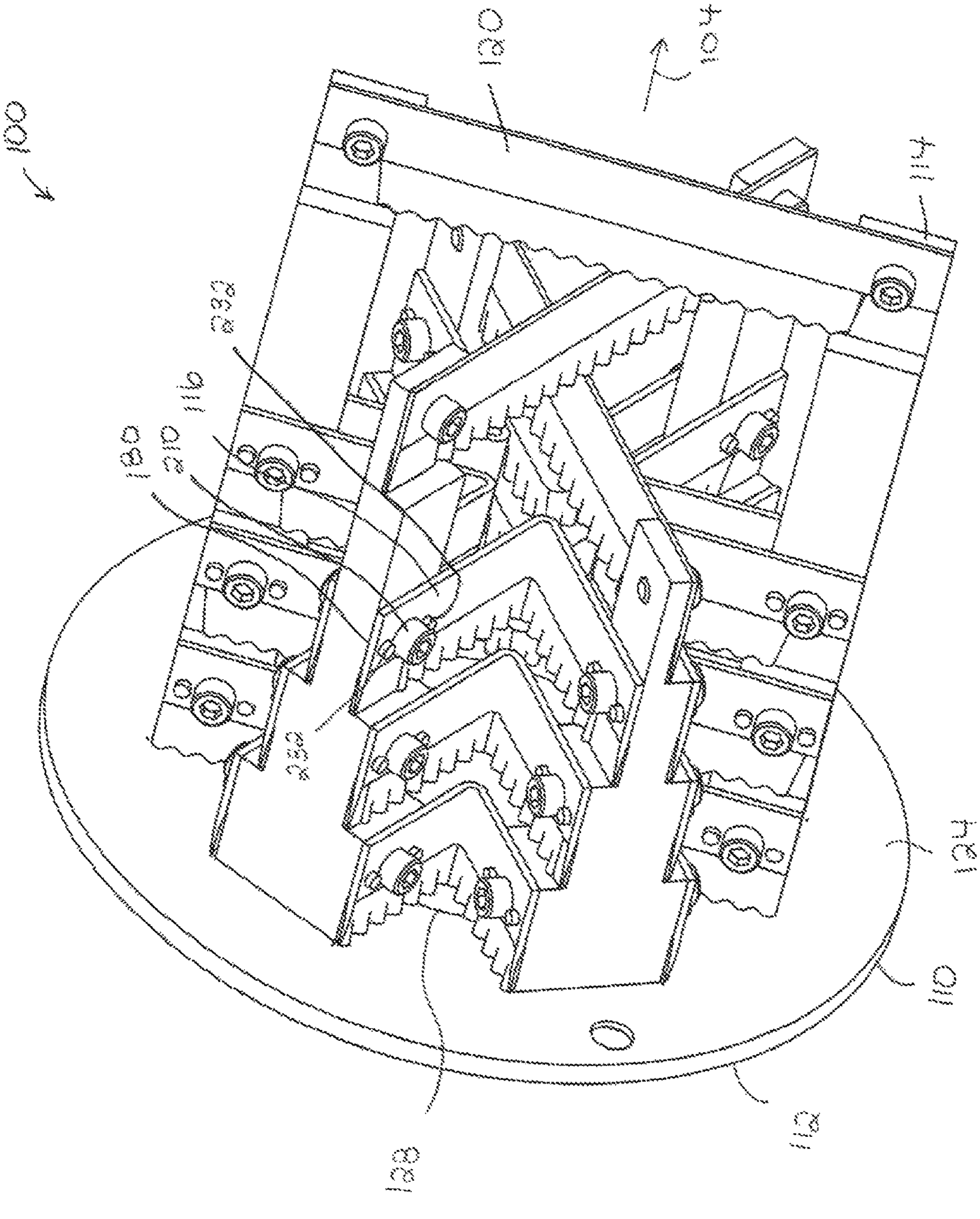
FIG. 12 is a perspective view of a blade assembly in accordance with another embodiment.
Figure 13:
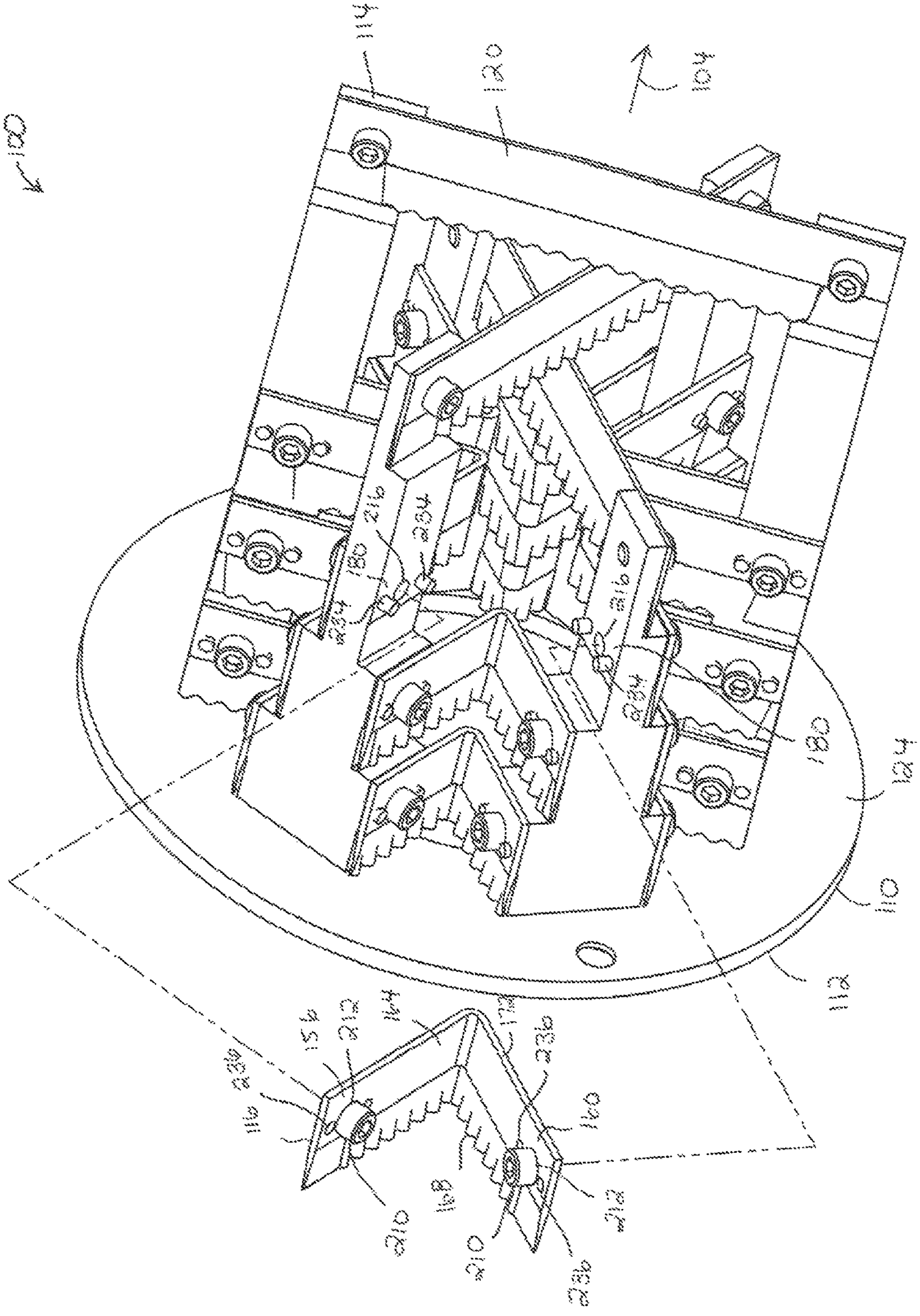
FIG. 13 is a partially exploded view of the blade assembly of FIG. 12.
Figure 14:
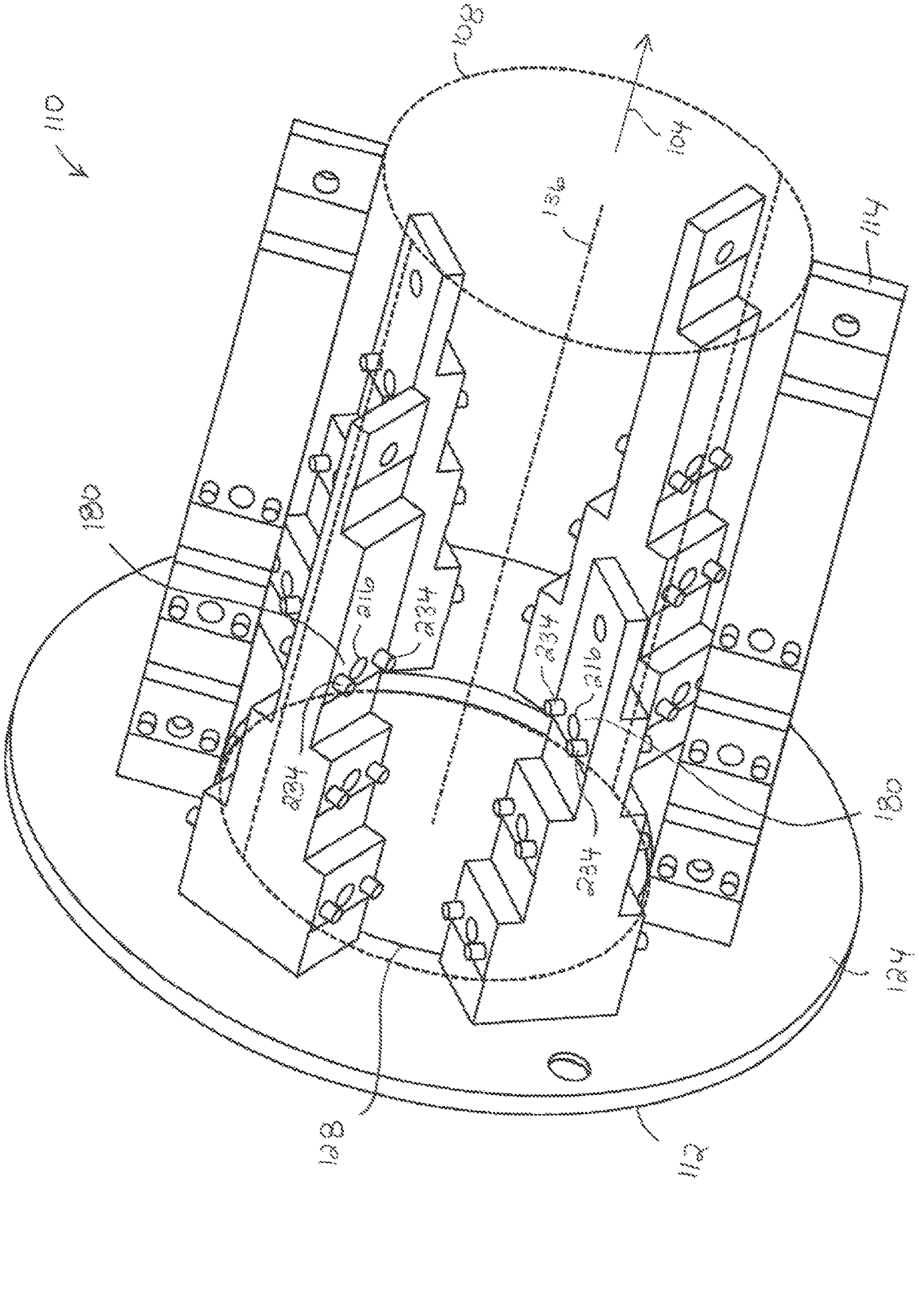
FIG. 14 is a perspective view of the blade support frame of the blade assembly of FIG. 12.

Reference is now made to FIGS. 12-14, which show another embodiment of blade assembly 100. As an alternative to (or in addition to) a blade mount recess 184 (FIG. 7) and multiple fasteners 210 (FIG. 10), each blade mount 180 may include at least one mounting pin 234 and support a removable fastener 210. Together, the removable fastener 210 and the one or more mounting pins 234 may provide superior torsional stability as compared to one removable fastener 210 alone, all else being equal. In addition, mounting pins 234 may conveniently hold a V-shaped blade 116 in position on a blade support frame 110 while a removable fastener 210 (e.g. screw or bolt) is inserted. This design may have lower cost and assembly time as compared with using several fasteners per blade mount 180, and may have similar or lesser manufacturing cost and complexity as compared with blade mounts 180 including blade mount recesses 184 (FIG. 7).

Each blade mount 180 may include one or more protruding mounting pins 234. This is in addition to supporting a removable fastener 210, such as by including a fastener aperture 216. Mounting pins 234 may be positioned spaced apart, and may align with corresponding pin apertures 236 in a blade end portion 156, 160. Mounting pins 234 may have any shape suitable to extend through blade pin apertures 236. For example, mounting pins 234 may be cylindrical as shown, an extruded polygon, or have another regular or irregular shape. Mounting pins 234 are preferably shaped and sized to pass through blade pin apertures 236 freely.

As shown, each mounting pin 234 may be spaced apart from the removable fastener 210 when a V-shaped blade 116 is fastened to the blade mount 180. For example, a mounting pin 234 may be spaced apart radially from fastener aperture 216 as shown. Alternatively or in addition, mounting pin 234 may be spaced apart in downstream direction 104 (i.e. towards blade upstream or downstream edge 168, 172). In the illustrated embodiment, each blade mount 180 includes two mounting pins 234, which flank fastener aperture 216. In alternative embodiments, mounting pins 234 may be both located to one side of fastener aperture 216.

Alternatively or in addition to a blade mount 180 including a mounting pin 234, a blade end portion 156, 160 may include a mounting pin that is sized and positioned to extend into a blade pin aperture of the respective blade mount 180.

Reference is now made to FIGS. 2, 6, and 7. In use, a potato 14, may be propelled in downstream direction 104 towards a blade assembly 100 in accordance with any embodiment. The blade assembly 100 may include V-shaped blades 116 having intermediate portions 164 that are unsupported in a food flow path 108 of the blade assembly 100. The potato 14 may impact the intermediate portions 164 of the V-shaped blades 116, which may exert a torque upon the V-shaped blades 116 to rotate towards downstream direction 104. However, the first and second end portions 156, 160 of each V-shaped blade 116 may be removably fastened to a respective blade mount 180 in a manner that inhibits the V-shaped blade 116 from rotating when impacted by the potato 14. The potato 14 may then continuing moving downstream past the downstream end of the food flow path 108, whereby the intermediate portions 164 of the V-shaped blades 116 may cut the potato 14 into V-shaped pieces 38.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

Items

Item 1: A blade assembly for cutting food, the blade assembly comprising:

a blade support frame having an upstream end, a downstream end, a food flow path extending from the upstream end to the downstream end, and a plurality of blade mounts distributed around the food flow path;

a plurality of V-shaped blades removably fastened to the blade support frame, each V-shaped blade having a first end portion connected to one of the blade mounts, a second end portion connected to another of the blade mounts, and an intermediate portion extending from the first end portion to the second end portion, the intermediate portion extending into the food flow path;

wherein each V-shaped blade includes an upstream edge and a downstream edge, the upstream and downstream edges each extending from the first end portion to the second end portion, and at the first and second end portions of each V-shaped blade, a respective one of the blade mounts overlies both the upstream edge and the downstream edge of the V-shaped blade to inhibit the V-shaped blade from rotating when impacted by food.

Item 2: The blade assembly of any preceding item, wherein:

the intermediate portion of each blade is unsupported.

Item 3: The blade assembly of any preceding item, wherein:

the intermediate portion of each V-shaped blade is bent with an inside angle of between 10 degrees and 85 degrees.

Item 4: The blade assembly of any preceding item, wherein:

the plurality of V-shaped blades includes a first plurality of spaced apart V-shaped blades, and a second plurality of spaced apart V-shaped blades located downstream of the first plurality of V-shaped blades.

Item 5: The blade assembly of any preceding item, wherein:

each of the first and second end portions of each V-shaped blade is received in a recess of a respective blade mount.

Item 6: The blade assembly of any preceding item, wherein:

each of the blade mounts includes an upstream portion, a downstream portion, and an intermediate portion that extends from the upstream portion to the downstream portion, the upstream and downstream portions projecting circumferentially from the intermediate portion to define the recess.

Item 7: The blade assembly of any preceding item, wherein:

each of the first and second end portions of each V-shaped blade is removably fastened to a respective blade mount by a removable fastener.

Item 8: The blade assembly of any preceding item, wherein:

the blade support frame comprises a plurality of blade support risers spaced apart circumferentially around the food flow path, each of the blade support risers including a plurality of the blade mounts, and for each of the V-shaped blades, the first end portion is removably fastened to one of the blade mounts on one of the blade support risers, and the second end portion is removably fastened to another of the blade mounts on the circumferentially adjacent blade support riser.

Item 9: The blade assembly of any preceding item, wherein:

the plurality of V-shaped blades comprises a plurality of blade groups, each blade group including at least two V-shaped blades that together define a V-shaped profile space when viewed parallel to a downstream direction.

Item 10: The blade assembly of any preceding item, wherein:

each of the two V-shaped blades of each blade group have different axial positions.

Item 11: The blade assembly of any preceding item, wherein:

a portion of the upstream edge of each V-shaped blade is received in a depression of a respective blade mount.

Item 12: A blade assembly for cutting food, the blade assembly comprising:

a blade support frame having an upstream end, a downstream end, a food flow path extending from the upstream end to the downstream end, and a plurality of blade mounts distributed around the food flow path;

a plurality of V-shaped blades removably fastened to the blade support frame, each V-shaped blade having a first end portion connected to one of the blade mounts, a second end portion connected to another of the blade mounts, and an intermediate portion extending from the first end portion to the second end portion, the intermediate portion extending into the food flow path;

wherein each of the first and second end portions of each V-shaped blade is removably fastened to a respective one of the blade mounts by at least two spaced apart removable fasteners to inhibit the V-shaped blade from rotating when impacted by food.

Item 13: The blade assembly of any preceding item, wherein:

the removable fasteners are threaded fasteners.

Item 14: The blade assembly of any preceding item, wherein:

the intermediate portion of each blade is unsupported.

Item 15: The blade assembly of any preceding item, wherein:

the blade support frame comprises a plurality of blade support risers spaced apart circumferentially around the food flow path, each of the blade support risers including a plurality of the blade mounts, and for each of the V-shaped blades, the first end portion is removably fastened to one of the blade mounts on one of the blade support risers, and the second end portion is removably fastened to another of the blade mounts on the circumferentially adjacent blade support riser.

Item 16: The blade assembly of any preceding item, wherein:

the plurality of V-shaped blades comprises a plurality of blade groups, each blade group including at least two V-shaped blades that together define a V-shaped profile space when viewed parallel to a downstream direction.

Item 17: A blade assembly for cutting food, the blade assembly comprising:

a blade support frame having an upstream end, a downstream end, a food flow path extending from the upstream end to the downstream end, and a plurality of blade mounts distributed around the food flow path;

a plurality of V-shaped blades removably fastened to the blade support frame, each V-shaped blade having a first end portion connected to one of the blade mounts, a second end portion connected to another of the blade mounts, and an intermediate portion extending from the first end portion to the second end portion, the intermediate portion extending into the food flow path;

wherein each of the first and second end portions of each V-shaped blade is removably fastened to a respective one of the blade mounts by at least one mounting pin and at least one removable fastener to inhibit the V-shaped blade from rotating when impacted by food.

Item 18: The blade assembly of any preceding item, wherein:

each blade mount comprises the at least one mounting pin.

Item 19: The blade assembly of any preceding item, wherein:

each of the first and second end portions of each V-shaped blade includes a pin aperture that receives a respective mounting pin of a respective blade mount.

Item 20: The blade assembly of any preceding item, wherein:

each of the first and second end portions of each V-shaped blade includes a fastener aperture spaced apart from the pin aperture.

Item 21: The blade assembly of any preceding item, wherein:

the intermediate portion of each blade is unsupported.

Item 22: The blade assembly of any preceding item, wherein:

the blade support frame comprises a plurality of blade support risers spaced apart circumferentially around the food flow path, each of the blade support risers including a plurality of the blade mounts, and for each of the V-shaped blades, the first end portion is removably fastened to one of the blade mounts on one of the blade support risers, and the second end portion is removably fastened to another of the blade mounts on the circumferentially adjacent blade support riser.

Item 23: A method of cutting a food product into V-shaped pieces, the method comprising:

propelling a food product downstream towards a blade assembly, the blade assembly comprising a plurality of V-shaped blades, each of the plurality of V-shaped blades having a first end portion, a second end portion, and an unsupported intermediate portion, wherein the unsupported intermediate portion is located in a food flow path of the blade assembly;

impacting the intermediate portions of the V-shaped blades with the food product, wherein each first end portion and each second end portion is removably fastened to a respective blade mount adapted to inhibit the V-shaped blade from rotating when impacted by the food product; and moving the food product to a downstream end of the food flow path, whereby the intermediate portion of the plurality of V-shaped blades cut the food product into the V-shaped pieces.

The invention claimed is:

1. A method of cutting a food product into V-shaped pieces, the method comprising:

propelling the food product downstream towards a blade assembly, the blade assembly comprising a plurality of V-shaped blades, each of the plurality of V-shaped blades having a first end portion located outside of a food flow path of the blade assembly, a second end portion located outside of the food flow path, and an intermediate portion extending from the first end portion to the second end portion, wherein the intermediate portion comprises an apex and is located in the food flow path, and wherein the intermediate portion is unsupported in that no element of the blade assembly within the food flow path is in direct contact with the intermediate portion;

impacting the intermediate portions of the V-shaped blades with the food product, wherein each first end portion and each second end portion is removably fastened to a respective blade mount adapted to inhibit the V-shaped blade from rotating when impacted by the food product; and moving the food product to a downstream end of the food flow path, whereby the intermediate portions of the plurality of V-shaped blades cut the food product into the V-shaped pieces, wherein:

the plurality of V-shaped blades comprises a plurality of blade groups, each blade group including at least two V-shaped blades, the apex of each V-shaped blade within the blade group being radially spaced apart from the apex of each other V-shaped blade within the blade group, the at least two V-shaped blades in each blade group together defining at least one V-shaped profile space when viewed parallel to a downstream direction, and said moving the food product to a downstream end of the food flow path comprises passing the food product through the V-shaped profile space of each blade group.

2. The method of claim 1, wherein:

the plurality of V-shaped blades includes a first plurality of spaced apart V-shaped blades, and a second plurality of spaced apart V-shaped blades located downstream of the first plurality of V-shaped blades, and said moving the food product to a downstream end of the food flow path comprises the food product impacting the first plurality of V-shaped blades before impacting the second plurality of V-shaped blades.

3. The method of claim 1, wherein:

the plurality of blade groups are circumferentially distributed about a centerline of the food flow path.

4. The method of claim 1, wherein:

the at least two V-shaped blades of each blade group include a first V-shaped blade located upstream of a second V-shaped blade, and said passing the food product through the V-shaped profile space of each blade group comprises:

for each blade group, cutting into the food product with the first V-shaped blade before cutting into the food product with the second V-shaped blade.

5. The method of claim 4, wherein:

for each blade group, the first V-shaped blade is radially nested with the second V-shaped blade.

6. The method of claim 4, wherein:

for each blade group, the first V-shaped blade is located radially outward of the second V-shaped blade.

7. The method of claim 1, wherein said impacting comprises:

the food product exerting torque at the first and second end portions of the V-shaped blades, and a depressed structure of each of the respective blade mounts inhibiting the V-shaped blades from rotating under the torque.

8. The method of claim 1, wherein said impacting comprises:

the food product exerting torque at the first and second end portions of the V-shaped blades, and at least two spaced apart removable fasteners joining each of the end portions to the respective blade mount inhibiting the V-shaped blades from rotating under the torque.

9. The method of claim 1, wherein said impacting comprises:

the food product exerting torque at the first and second end portions of the V-shaped blades, and at least one mounting pin and at least one removable fastener joining each of the end portions to the respective blade mount inhibiting the V-shaped blades from rotating under the torque.

10. The method of claim 1, wherein each of the V-shaped pieces comprises a concave interior cut by one of the V-shaped blades and nested with a convex exterior cut by another of the V-shaped blades.

* * * * *